(12) United States Patent
Wang et al.

(10) Patent No.: US 7,064,841 B2
(45) Date of Patent: Jun. 20, 2006

(54) METHOD AND ARRANGEMENT FOR TOPOGRAPHICALLY CHARACTERIZING A SURFACE OF A HARD DISK WITH DISTORTION DUE TO DISK MODES REMOVED

(75) Inventors: Jianmin Wang, Fremont, CA (US); Jason L. Pressesky, Menlo Park, CA (US); Huan Tang, Los Altos, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 230 days.

(21) Appl. No.: 10/782,910

(22) Filed: Feb. 23, 2004

(65) Prior Publication Data

US 2004/0196468 A1 Oct. 7, 2004

Related U.S. Application Data

(60) Provisional application No. 60/459,660, filed on Apr. 1, 2003.

(51) Int. Cl.
*G01B 9/02* (2006.01)
(52) U.S. Cl. .................................................. 356/495
(58) Field of Classification Search ............... 356/491, 356/492, 493, 494, 495
See application file for complete search history.

(56) References Cited

U.S. PATENT DOCUMENTS

| | | | | |
|---|---|---|---|---|
| 5,600,441 A | * | 2/1997 | de Groot et al. | 356/492 |
| 5,710,631 A | * | 1/1998 | Bou-Ghannam et al. | 356/495 |
| 5,999,261 A | * | 12/1999 | Pressesky et al. | 356/487 |
| 6,214,430 B1 | * | 4/2001 | Kim et al. | 428/64.1 |
| 6,618,218 B1 | * | 9/2003 | Kadowaki et al. | 360/77.03 |
| 6,741,357 B1 | * | 5/2004 | Wang et al. | 356/493 |

* cited by examiner

*Primary Examiner*—Gregory J. Toatley, Jr.
*Assistant Examiner*—Michael A. Lyons
(74) *Attorney, Agent, or Firm*—McDermott Will & Emery LLP

(57) ABSTRACT

An arrangement and method of measuring head-media spacing modulation (HMS_Wq) removes the portion of out-of-plane motion caused by disk modes from the dynamic measurements of hard disk surface topography. Employing time-domain measurement techniques, circumferential surface topographical measurements are made for a hard disk surface. A boundary wavelength is determined, and a first partial HMS_Wq value is determined based upon measurements taken at a first disk rotational speed. A second partial HMS_Wq value is determined based upon measurements taken at a second disk rotational speed. The first and second partial HMS_Wq values are combined to provide a complete and accurate HMS_Wq value, taking advantage of the principle that the disk mode location in the spatial domain topography spectrum converted from the measured time-domain data shifts when the disk rotation speed is changed during the measurement.

20 Claims, 2 Drawing Sheets

US 7,064,841 B2

METHOD AND ARRANGEMENT FOR TOPOGRAPHICALLY CHARACTERIZING A SURFACE OF A HARD DISK WITH DISTORTION DUE TO DISK MODES REMOVED

RELATED APPLICATIONS

This Application claims priority to provisional Application Ser. No. 60/459,660 filed on Apr. 1, 2003, the entire disclosure of which is hereby incorporated by reference.

FIELD OF THE INVENTION

The present invention relates to characterizing the topography of a surface, and more particularly, to the dynamic measurement of hard disk static surface topography.

BACKGROUND OF THE INVENTION

A form of an information storage and retrieval device is a hard disk drive (hereinafter "disk drive"). A disk drive is conventionally used for information storage and retrieval with computers, data recorders, redundant arrays of independent disks (RAIDs), multi-media recorders, and the like. A disk drive comprises one or more disk media.

Each disk medium comprises a substrate upon which materials are deposited to provide a magnetically sensitive surface. In forming a disk medium, a substrate is ground or polished, conventionally by chemical-mechanical or mechanical polishing, to provide a substantially planar surface. Layers of materials are substantially uniformly deposited on this substantially planar surface to provide magnetic properties for writing to and reading from the disk media.

However, surface irregularities, waviness may affect the surface topography of the disk medium, and need to be detected and characterized. A number of different types of apparatus can be used to measure the surface topography. These include a quadrature phase shift interferometer, or a laser doppler vibrometer, for example. However, dynamic measurements of hard disk static surface topography provided by these instruments, such as the measurement of HMS_Wq (r.m.s. Head-Media Spacing Modulation) are easily contaminated by additional out-of-plane motion from disk flutter associated with disk resonance modes.

Disk modes are characterized by their specific temporal frequencies and their specific spatial patterns. The frequencies of the disk modes are determined by the material mechanical properties, such as stiffness and mass density, and disk geometry. By contrast, the spatial wavelengths of the disk modes are determined solely by the disk geometry. The disk modes can be excited by windage, mass imbalance, spindle motor vibrations, or a combination of these factors.

Time-domain disk surface out-of-plane motion associated with the disk modes is also detected, along with the static disk surface topography, using time-domain measurement techniques such as quadrature phase shift interferometry and laser doppler vibrometery. Because there is a total disconnect between the temporal and spatial frequencies associated with each disk mode, this out-of-plane motion captured by the time-domain techniques can significantly distort the space-domain disk surface topography obtained from time-domain measurement. As a result, the accuracy of calculated HMS_Wq results can be severely degraded.

SUMMARY OF THE INVENTION

There is a need for a method and an arrangement for accurately characterizing the spatial domain disk surface topography with removal of the portion of out-of-plane motion caused by disk modes from the measured results.

This and other needs are met by embodiments of the present invention which provide a method of measuring head-media spacing modulation (HMS_Wq) comprising the steps of determining disk mode frequency for a disk and then determining HMS_Wq with surface distortion due to disk modes removed. In certain embodiments of the invention, the step of determining HMS_Wq includes determining a boundary wavelength by determining a first partial HMS_Wq value in a wavelength region below the boundary wavelength, and determining a second partial HMS_Wq value in a wavelength region above the boundary wavelength. These first and second partial HMS_Wq values are combined to produce the HMS_Wq with surface distortion due to disk modes removed.

The invention provides for the separation and removal of disk modes in time-domain topographical characterization of hard disk surfaces. The method takes advantage of the principle that the disk mode location in the spatial domain topography spectrum converted from the measured time-domain data will shift when disk rotation speed is changed during the measurement.

The earlier stated needs are also met by other aspects of the present invention which provide an arrangement for topographically characterizing a surface of a hard disk comprising a measurement device that performs time-domain measurement of circumferential surface topography of the disk. The processor is configured to remove disk modes from the time-domain measurement of the circumferential surface topography. In certain embodiments, the measurement devices are configured to perform measurements at different rotation speeds of the disk.

The earlier stated needs are also met by other aspects of the present invention which provide a surface topography characterization arrangement for a disk, comprising a surface topography measurement device that produces a topographical characterization of a surface of the disk, and means for removing disk modes from the topographical characterization.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the removal of disk modes in the dynamic measurement of hard disk static surface topography, such as the measurement of HMS_Wq. In particular, the present invention removes the contamination of out-of-plane motion from disk flutter associated with disk resonance modes from the measured results for HMS_Wq, such that the spatial domain disk surface topography is accurately characterized. The invention takes advantage of the principle that the disk mode location and the spatial domain topography spectrum converted from the measured time-domain data will shift when the disk rotation speed is changed during a measurement. This is accomplished by rotating the disk at different rotational speeds and calculating partial HMS_Wq values at these different speeds and combining the partial HMS_Wq values into an accurate and complete HMS_Wq value for the disk, with a surface distortion due to disk modes having been removed.

The present invention can be embodied in a number of different arrangements, which employ different types of measurement devices. For example, the invention can be applied to measuring the surface topography with a quadrature phase shift interferometer or a laser doppler vibrometer. For purposes of explanation, an exemplary embodiment of a quadrature phase shift interferometer will be described with respect to FIGS. 1–3. However, the invention may be applied to other profilometers and arrangements for measuring surface topography of a hard disk surface, as will be recognized by one of ordinary skill in the art.

Figure 1:
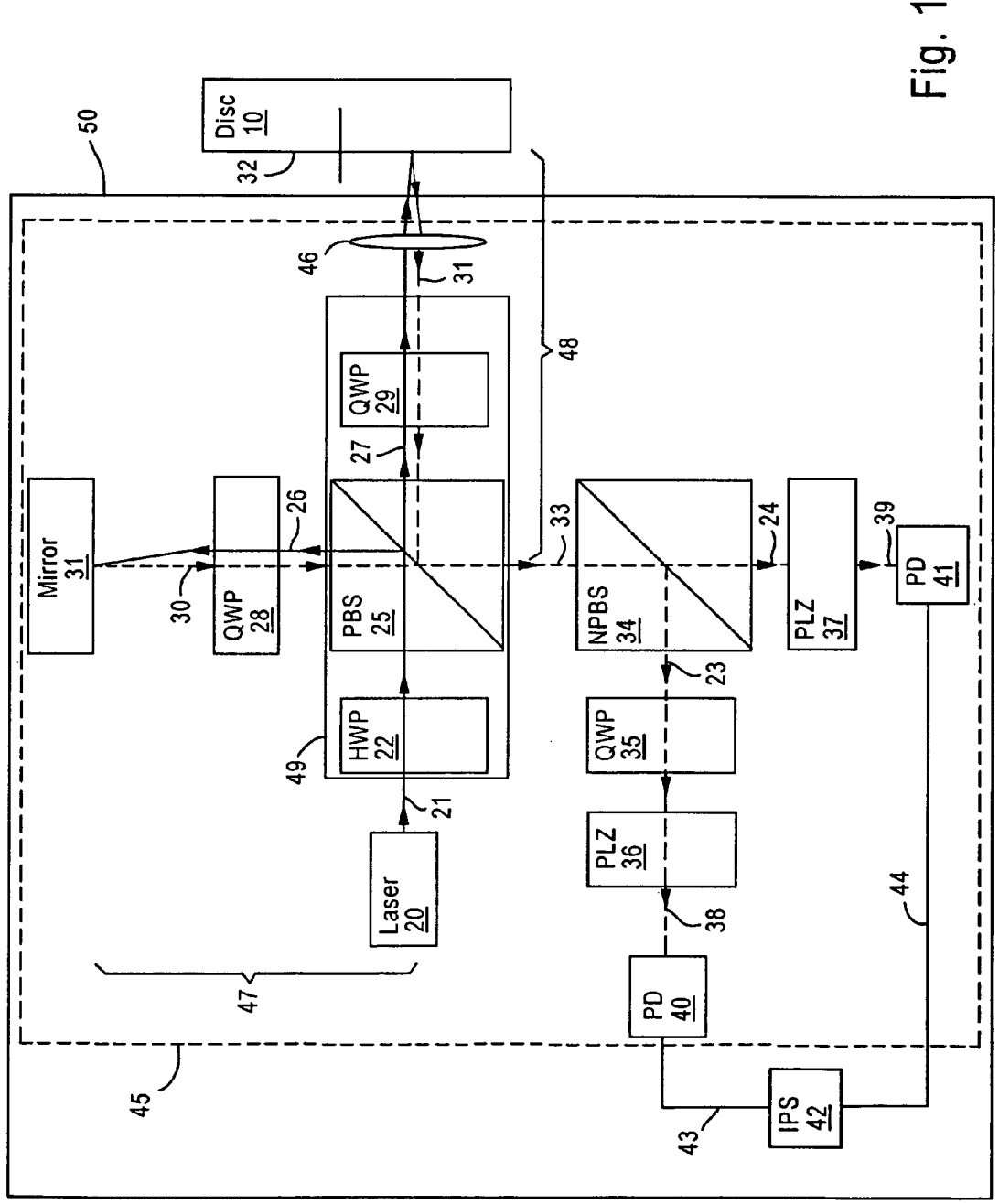
FIG. 1 is an optical layout of an exemplary portion of an embodiment of an exemplary arrangement of an apparatus that can be employed with the present invention.

FIG. 1 is an optical layout of an exemplary portion of an embodiment of an interferometer system 50 in accordance with one or more aspects of the present invention. As will be understood, interferometer system 50, or more particularly quadrature phase shift interferometer 45, uses two polarization processes to create two independent interference signals, which are phase shifted with respect to one another. The presence of two independent signals in phase quadrature facilitates unwrapping of phase.

With continuing reference to FIG. 1, laser or laser beam source 20 is configured to provide a laser or other optical energy beam 21. Laser 20 may be configured to provide a linearly polarized laser beam. For example, a Helium-Neon (He—Ne) laser may be used, though it should be understood that the present invention may be used with known lasers of other wavelengths. Laser beam 21 is a linearly polarized laser beam. Laser beam 21 is provided to variable ratio beam splitter 49.

Variable ratio beam splitter 49 comprises a polarizing beam splitter (PBS) 25 and half-wave plate (HWP) 22. Notably, half-wave plate 22 is configured to rotate. By rotating half-wave plate 22, relative intensity or amplitude of reference beam 26 and object beam 27 may be adjusted. Half-wave plate 22 is used to rotate the direction of polarization of laser beam 21 with respect to polarizing beam splitter 25. In other words, direction of orientation is adjusted such that polarizing beam splitter receives components of s-polarization and p-polarization. Laser beam 21 is provided to half-wave plate 22 and then to polarizing beam splitter 25. Polarizing beam splitter 25 splits laser beam 21 into a reference beam 26 and an object or measurement beam 27 according to s-polarization and p-polarization components. An aspect of the present invention is to balance intensity of reference beam 26 and object beam 27. Alternatively, half-wave plate 22 may be removed and direction of polarization controlled by rotation of laser 20.

Reference beam 26 and object beam 27 are polarized beams with polarizations perpendicular or orthogonal to one another. Thus, reference beam 26 may comprise only the s-polarized component of laser beam 21 and object beam 27 may comprise only the p-polarized component. Notably, reference beam 26 and object beam 27 are interchangeable.

Reference beam 26 is provided to quarter-wave plate (QWP) 28 and then to mirror 31. Reference beam 26 enters a passive side of quarter-wave plate 28. Reference beam 26 is reflected off an optically reflective surface of mirror 31 to provide reflected reference beam 30, as shown with a dashed line. For purposes of clarity, beams post-reflection and pre-recombination are shown with a dashed line.

Reflected reference beam 30 is provided to quarter-wave plate 28. Quarter-wave plate 28, as well as quarter waveplate 29, are used to reduce power loss due to subsequent combination of reflected reference beam 30 and reflected object beam 31, respectively. Reference beam 26 immediately prior to passing through quarter-wave plate 28 comprises only linear polarization, namely s-polarization, components. After passing through quarter-wave plate 28, reference beam 26 linear polarization components are converted to circular polarization components. Reflected reference beam 30 immediately prior to passing through quarter-wave plate 28 comprises only circular polarization components. After passing through quarter-wave plate 28, reflected reference beam 30 circular polarization components are converted to linear polarization, namely p-polarization, components, and thus reflected reference beam with p-polarization components passes straight through polarizing beam splitter 25 for providing a portion of combinative beam 33.

Object beam 27 is provided to a passive side of quarter-wave plate 29 and then to lens 46. Lens 46 is used to reduce spot size of object beam 27 for imaging of surface 32 of disk medium 10. Spot size determines resolution for inspection purposes, and thus a smaller spot size allows smaller irregularities to be resolved. Focused object beam 27 from lens 46 leaves interferometer system 50 and then is reflected from surface 32 to re-enter interferometer system 50 back to lens 46, where it is reset to approximately the same spot size prior to focusing. Disk 10 is a moving, such as rotating, target. From lens 46, reflected object beam 31 is provided to quarter-wave plate 29. Object beam 27 immediately prior to passing through quarter-wave plate 29 comprises only p-polarization components. After passing through quarter-wave plate 29, object beam 27 comprises only circular polarization components. Reflected object beam 31 immediately prior to passing through quarter-wave plate 29 comprises only circular polarization components. After passing through quarter-wave plate 29, reflected object beam 31 comprises only s-polarization components, and thus as reflected object beam 31 enters from a side opposite to that of original entry to polarizing beam splitter 25, it is orthogonal diverted by polarizing beam splitter 25 in a direction opposite to that of reference beam 26 for providing a portion of combinative beam 33.

Notably difference in optical path length 48 and optical path length 47 is less than laser beam coherence length. Furthermore, it should be understood that surface irregularities on surface 32 causes displacement in optical path length 48. For example depending on reference level, a depression lengthens optical path length 48, both with respect to object beam 27 and reflected object beam 31, while a bump shortens optical path length 48. Maximum allowed displacement is limited by focus depth of lens 46. Optical path length 48 is modulated by surface 32, if surface 32 is moving. Optical path length 48 is modulated by out-of-plane, or more particularly out-of-reference plane, movement of surface 32.

Reflected reference beam 30 and reflected object beam 31 are combined by polarizing beam splitter 25 to provide combinative beam 33. Combinative beam 33 comprises a reflected reference beam portion and a reflective object beam portion, as respective polarization directions of these portions are orthogonal. In other words, the reflected reference beam portion and the reflective object beam portion in combinative beam 33 do not interfere with one another.

Combinative beam 33 is provided from polarizing beam splitter 25 to non-polarizing beam splitter 34 (NPBS). Non-polarizing beam splitter 34 amplitude splits combinative beam 33 into output beam 23 and output beam 24.

One of output beam 23 or 24 is provided to a quarter-wave plate. In the embodiment shown in FIG. 1, output beam 23 is provided to quarter-wave plate 35. Quarter-wave plate 35 introduces a phase shift between reflected reference and reflected object beam portions or components of output beam 23. Quarter-wave plate 35 may be adjustable. Thus, for example, quarter-wave plate 35 could be adjusted, as needed, to introduce a target phase shift, for example approximately 90 degrees, between reflected reference and reflected object beam components of output beam 23. As described in more detail below, because two waves phase shifted with respect to one another are used, unwrapping of phase is facilitated. Such a phase shift is used for providing a quadrature output, as stated above. However, if outputs were viewed only in parallel, then quarter-wave plate 35 may be omitted. Notably, reflected reference and reflected object beam components of output beam 23, or output beam 24 for that matter, are still orthogonally polarized with respect to one another.

Polarizer 36 receives phase-shifted output beam 23 and assembles its reflected reference and reflected object beam components along a predetermined direction, for example approximately 45 degrees, to the vertical and horizontal axes of polarization of such components to provide assembled beam 38. As mentioned above HWP 22 is used to balance the beams, but if such beams were out of balance, a predetermined direction or angle may be selected or adjusted to enhance contrast of the interference. So, if reflected object and reference beam components are out of balance, then another angle may be selected to enhance the contrast by equalizing contributions of each such component in assembly of assembled beam 38. Assembled beam 38 may have interference between assembled reflected reference and reflected object beam components in response to displacement in optical path length 48 caused by surface irregularities or other surface inconsistencies, or from a nominal surface condition depending on reference plane selection, as mentioned above.

Polarizer 37 receives output beam 24 and assembles its reflected reference and reflected object beam components along a predetermined direction, for example approximately 45 degrees, to the vertical and horizontal axes of polarization of such components to provide assembled beam 39. Assembled beam 39 may have interference between assembled reflected reference and reflected object beam components in response to displacement in optical path length 48 caused by surface irregularities or other surface inconsistencies, or from a nominal surface condition, as mentioned above.

Assuming surface irregularities or waviness exist and are detected, reflected reference and reflected object beam components interfere in assembled beams 38 and 39 to produce moving fringes representing modulation of optical path length 48. Such moving fringes, which are temporal variation in light intensity, may be observed in both output beams 38 and 39 in parallel. Alternatively, such moving fringes may be observed in both assembled beams 38 and 39 in parallel and in phase quadrature, as described in more detail in U.S. Pat. No. 5,999,261.

Assembled beams 38 and 39 are provided to optical detectors 40 and 41, respectively. Optical detectors 40 and 41 may be photodiode detectors. Detectors 40 and 41 operate at a speed sufficient to capture fringes from assembled beams 38 and 39 and deliver respective voltages proportional to temporal light intensity change as signals 43 and 44, respectively, for subsequent digital signal processing by information processing system (IPS) 42.

Figure 2:
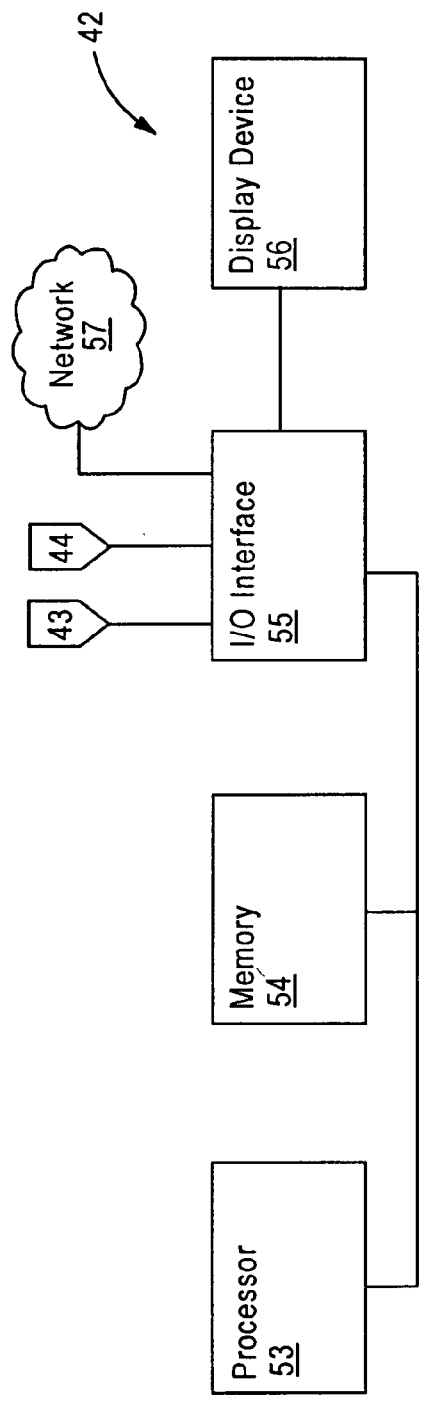
FIG. 2 is a block diagram of an exemplary portion of an embodiment of an information processing system configured to receive light intensity voltage signals in accordance with one or more aspects of the invention.

Referring to FIG. 2, there is shown a block diagram of an exemplary portion of an embodiment of an information processing system 42 configured to receive light intensity voltage signals 43 and 44 in accordance with one or more aspects of the present invention. Information processing system comprises processor 53, memory 54, input/output interface 55 and display device 56. Information processing system 42 may be a programmed personal computer or a digital oscilloscope or other known device for processing signals of the form of signals 43 and 44.

Signals 43 and 44, as mentioned above, represent temporal interference fringes formed in response to temporal phase difference, Ø, between reflected reference beam 30 and reflected object beams 31. Temporal phase difference or phase, Ø, is a function of object displacement, d, namely displacement caused by disk medium surface 32 out-of-plane motion. This relationship may be expressed as, $$\emptyset = (4\pi d)/\lambda \quad (1)$$

where wavelength, λ, is wavelength of laser beam 21. Notice that if displacement, d, equals 0, then phase Ø equals 0, or in other words disk medium surface 32 is flat, which may be taken as a reference location. However, it is not necessary to take the flat or unaffected portion of a disk media surface 32 as a reference location or plane. Accordingly, it should be understood that displacement, d, is a value depending on a reference location. Thus, displacement d is actually a change in displacement, Δd, with respect to such a reference location. Likewise, phase, Ø, is actually a change is phase, ΔØ, due to change in displacement.

Assuming interferometer system 50 is properly aligned and adjusted, intensity I received at optical detector 40 and intensity Q received at optical detector 41 may be represented as, $$I = I_a + I_b \cos(\emptyset) \quad (2A)$$

$$Q = Q_a - Q_b \sin(\emptyset) \quad (2B)$$

where, $$I_a = (I_{max} + I_{min})/2 \quad (3A)$$

$$I_b = (I_{max} - I_{min})/2 \quad (3B)$$

$$Q_a = (Q_{max} + Q_{min})/2 \quad (3C)$$

$$Q_b = (Q_{max} - Q_{min})/2 \quad (3D)$$

where $I_{max}$ and $I_{min}$ are the maximum and minimum intensities of the I beam, namely assembled beam 38, and where $Q_{max}$ and $Q_{min}$ are the maximum and minimum intensities of the Q beam, namely assembled beam 39. An accurate and reliable method for finding the values of true maxima and minima of the interference signals is described in related application U.S. application Ser. No. 10/782,875.

Because phase angle is used as the argument for a sine and a cosine function as in Equations (2A) and (2B) [collectively "Equations (2)"], phase wrapping occurs. In other words, phase wraps around to the same value for every 2π increase or decrease. To obtain the actual phase in Equation (1), phase from Equations (2) must be unwrapped. However, because phase Ø directly resolved from Equations (2) yield the principal value of phase, the first step of unwrapping phase is to calculate the phase angle and extend it into a 0 to $2\pi$ phase range. To calculate phase angle in a 0 to $2\pi$ phase range, phase is calculated according to rules or boundary conditions of Equations (4A) and (4B) for phase angle of assembled beam 38, $$Å=\cos^{-1}[(I-I_a)/I_b] \text{ for } Q-Q_a \leq 0 \quad (4A)$$

$$Ø=2\pi-\cos^{-1}[(I-I_a)/I_b] \text{ for } Q-Q_a > 0 \quad (4B)$$

and Equations (5A), (5B) and (5C) for phase angle of assembled beam 39, $$Ø=\sin^{-1}[(Q_a-Q)/Q_b] \text{ for } I-I_a \geq 0 \text{ and } Q-Q_a \leq 0 \quad (5A)$$

$$Ø=\pi-\sin^{-1}[(Q_a-Q)/Q_b] \text{ for } I-I_a \geq 0 \quad (5B)$$

$$Ø=2\pi+\sin^{-1}[(Q_a-Q)/Q_b] \text{ for } I-I_a \geq 0 \text{ and } Q-Q_a > 0 \quad (5C)$$

The above represents just one exemplary arrangement for obtaining circumferential surface topography measurements of a disk at the radius of the test point. In accordance with the invention, the disk 10 is able to be rotated at different rotational disk speeds, and the processor 53 is configured to perform the method of the present invention to remove the portion of out-of-plane motion caused by disk modes from the measured results.

Assuming that a test surface with a sinusoidal topography is moving with a speed of v, the detected temporal frequency, f, of height change of the surface from a fixed point is:

$$f=v/s \quad (6)$$

where s is the spatial wavelength of the sinusoidal wave along the motion direction. For a surface that is in rotation, equation (6) can be rewritten as $$f = \frac{2\pi r \Omega}{60 s} \quad (7)$$

or $$s = \frac{2\pi r \Omega}{60 f} \quad (8)$$

where r is the radius at the test point and $\Omega$ is the spindle rotational speed, in units of RPM (Revolutions Per Minute). After taking into consideration the disk mode effects, equation (8) can be written as:

$$s = \frac{2\pi r \Omega}{60(f \pm n \cdot \Delta f)} \quad (9)$$

where, n=0, 1, 2 . . . which is the order of disk mode in the definition of M(m,n); $\Delta f$ is the frequency shift detected by QPSI or LDV, due to disk rotation. $\Delta f$ is simply the disk rotational frequency given by:

$$\Delta f = \Omega/60 \quad (10)$$

As discussed above, the frequency of a disk mode is determined by the disk mechanical properties only. In other words, the disk mode frequency does not change due to any changes in the disk spinning speed. In accordance with aspects of the present invention, the disk 10 is tested at two different rotational speeds, one high speed and one low speed, to separate the disk modes from the regions of interest in a respective spatial domain spectra collected at the high and low speeds. As an example, consider a M(0,0) disk mode residence with a typical frequency of 1.8 kHz. If the disk is observed at a radius of 25.4 mm in first and second rotational speeds of 6,000 and 600 rpm respectively, the inferred wavelengths associated with the disk modes are 8.866 and 0.887 mm.

In accordance with aspects of the present invention, a boundary wavelength, or stitching boundary wavelength, is determined to separate the disk modes in performing an HMS_Wq calculation. This boundary wavelength is determined as follows:

$$\Lambda = \pi r \left( \frac{\Omega_1}{60f + n\Omega_1} - \frac{\Omega_2}{60f - n\Omega_2} \right) \quad (11)$$

where $\Omega_1 > \Omega_2$ and n=0, 1, 2, 3 . . . , which can be determined by calculation or experiment.

Figure 3:
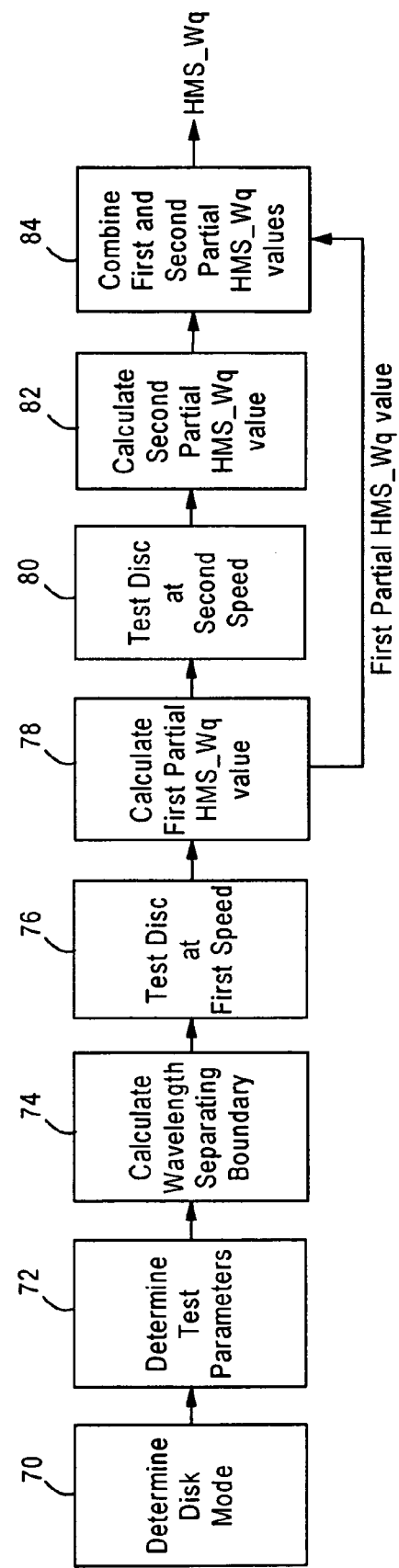
FIG. 3 is a flowchart describing certain steps of the removal of disk modes from the surface topography measurement in accordance with embodiments of the present invention.

FIG. 3 is a flow chart of an exemplary methodology for determining an accurate HMS_Wq with disk modes removed, in accordance with embodiments of the present invention.

In step 70, the disk mode frequency is determined for a disk, either by a calculation or experiment. Determination of disk mode frequency, as discussed earlier, is based upon the disk mechanical properties only. The determination of the disk mode frequencies is performed in a conventional manner.

Test parameters, such as rotational speed and the testing radius on a disk, are determined in step 72. Conventional testing parameters may be employed, but in the present invention, at least two rotational speeds that are adequately separated from one another are employed in order to implement the present invention. The testing at two different disk rotation speeds takes advantage of the principle that the disk mode location in the spatial domain topography spectrum converted from the measured time domain data will shift when the disk rotation speed is changed during the measurement.

In step 74 the wavelength separating boundary, $\Lambda$, is determined, employing equation (6) above. The disk is then rotated at a relatively high rotational speed, the "first" rotational speed, in step 76, and measurements are taken by the quadrature phase shift interferometer 45 or other profilometer. Processor 53 in step 78 determines a first partial HMS_Wq value over the wavelength region that is below the stitching boundary wavelength $\Lambda$. Hence, in a first calculation, the first partial HMS_Wq value is determined for the wavelength region below the stitching boundary wavelength $\Lambda$ with the disk rotation speed in a first, relatively higher rotational speed.

In step 80, the disk 10 is rotated at a second, lower rotational speed and the measurements are taken by the quadrature phase shift interferometer 45 or other profilometer. The measurements are employed by the processor 82 to calculate a second partial HMS_Wq value over a wavelength region that is above the stitching boundary wavelength $\Lambda$.

In order to calculate the partial HMS_Wq values, the spectrum of the surface topography signals are analyzed by employing a fast fourier transform (FFT). Integration of the product of the surface topography power spectral density (PSD) and the air bearing transfer function, evaluated over a micro-waviness wavelength range, determines the partial HMS_Wq for the wavelength regions described. The calculation of HMS_Wq values is known to those of ordinary skill in the art.

In step 84, the first and second partial HMS_Wq values determined in step 78 and 82 are combined to form a complete and accurate HMS_Wq value. In the complete HMS_Wq value, the surface distortion due to disk modes has been removed. In exemplary embodiments of the present invention, the two partial, yet complementary, HMS_Wq values are combined using a root-sum-squared method. Other methods for combining the first and second partial HMS_Wq values may be employed without departing from the scope of the present invention.

As stated earlier, the use of a quadrature phase shift interferometer 45, and in particular the profilometer of FIGS. 1–3, is but one example of a profilometer that may be employed with the present invention. Other types of profilometers, such as laser doppler vibrometers, may be employed without departing from the scope of the present invention.

Embodiments of the present invention provide arrangements and methods for removing the disk modes from the dynamic measurements of hard disk static surface topography, such as in the measurements of HMS_Wq. The methods and arrangement remove the disk modes from time-domain topographical characterizations of the hard disk surfaces. They are based on the principle that the disk mode location in the spatial domain topography spectrum converted from the measured time-domain data will shift when the disk rotation speed is changed during the measurement.

Although the present invention has been described and illustrated in detail, it is to be clearly understood that the same is by way of illustration and example only, and is not to be taken by way of limitation, the scope of the present invention being limited only by the terms of the appended claims.

What is claimed is:

1. A method of measuring head-media spacing modulation (HMS_Wq), comprising the steps:
determining disk mode frequency for a disk; and
determining HMS_Wq with surface distortion due to disk modes removed.

2. The method of claim 1, wherein the step of determining HMS_Wq includes determining a boundary wavelength.

3. The method of claim 2, wherein the step of determining HMS_Wq further includes: determining a first partial HMS_Wq value in a wavelength region below the boundary wavelength; and determining a second partial HMS_Wq value in a wavelength region above the boundary wavelength.

4. The method of claim 3, wherein the step of determining HMS_Wq further includes combining the first and second partial HMS_Wq values.

5. The method of claim 4, wherein the method of combining includes performing a root-sum-squared combining of the first and second partial HMS_Wq values to produce the HMS_Wq with surface distortion due to disk modes removed.

6. The method of claim 5, wherein the step of determining a first partial HMS_Wq value includes testing the disk at a first rotational speed and the step of determining a second partial HMS_Wq value includes testing the disk at a second rotational speed that is less than the first rotational speed.

7. The method of claim 6, wherein the step of determining a boundary wavelength $\Lambda$ includes calculating the boundary wavelength $\Lambda$ in accordance with the equation:

$$\Lambda = \pi r \left( \frac{\Omega_1}{60f + n\Omega_1} - \frac{\Omega_2}{60f - n\Omega_2} \right)$$

where r is the radius of a test point on the disk, $\Omega_1$ is the first rotational speed, $\Omega_2$ is the second rotational speed, f is disk mode frequency, and n is the order of the disk mode.

8. The method of claim 7, wherein the steps of determining the first and second partial HMS_Wq values each include: measuring circumferential surface topography of the disk at the radius of the test point; determining the spectrum of the measured circumferential surface topography to generate a surface topography power spectral density; and integrating a product of the surface topography power spectral density and an air bearing transfer function.

9. The method of claim 8, wherein the step of measuring circumferential surface topography includes using at least one of a quadrature phase shift interferometer or a laser doppler vibrometer.

10. An arrangement for topographically characterizing a surface of a hard disk, comprising:
a measurement device that performs time-domain measurement of circumferential surface topography of the disk; and
a processor configured to remove disk modes from the time-domain measurement of the circumferential surface topography.

11. The arrangement of claim 10, wherein the measurement device is configured to perform measurements at different rotation speeds of the disk.

12. The arrangement of claim 11, wherein the processor is further configured to convert the time-domain data to spatial domain data, a disk mode location shifting in a spatial domain topography spectrum between measurements at the different rotation speeds.

13. The arrangement of claim 12, wherein the processor is further configured to determine a first partial head-media spacing modulation (HMS_Wq) over a first wavelength region below a boundary wavelength, and a second partial HMS_Wq over a second wavelength region above the boundary wavelength.

14. The arrangement of claim 13, wherein the processor is configured to determine the first partial HMS_Wq based on measurements made by the measurement device during rotation of the disk at a first rotational speed, and to determine the second partial HMS_Wq based on measurements made by the measurement device during rotation of the disk at a second rotational speed that is lower than the first rotational speed.

15. The arrangement of claim 14, wherein the processor is further configured to combine the first and second partial HMS_Wq values to form a HMS_Wq value for the disk with the disk modes removed.

16. The arrangement of claim 15, wherein the processor is configured to combine the first and second partial HMS_Wq values by a root-sum-squared method.

17. The arrangement of claim 16, wherein the boundary wavelength $\Lambda$ is determined according to the following equation:

$$\Lambda = \pi r \left( \frac{\Omega_1}{60f + n\Omega_1} - \frac{\Omega_2}{60f - n\Omega_2} \right),$$

where:
- r is the radius of a test point of the disk;
- $\Omega_1$ is the first rotational speed;
- $\Omega_2$ is the second rotational speed;
- f is disk mode frequency; and
- n is the order of the disk mode.

18. The arrangement of claim 17, wherein the measurement device comprises at least one of a quadrature phase shift interferometer or a laser doppler vibrometer.

19. A surface topography characterization arrangement for a disk, comprising:

a surface topography measurement device that produces a topographical characterization of a surface of the disk; and means for removing disk modes from the topographical characterization.

20. The arrangement of claim 19, wherein the means for removing includes means for determining a boundary wavelength, rotating the disk at a first rotational speed and determining a first partial head-media spacing modulation (HMS_Wq) value for a wavelength region below the boundary wavelength, rotating the disk at a second rotational speed different from the first rotational speed and determining a second partial HMS_Wq value for a wavelength region above the boundary wavelength, and combining the first and second partial HMS_Wq values to form a complete HMS_Wq value for the disk with the disk modes removed.

* * * * *